United States Patent [19]

Chabrol

[11] 4,223,313

[45] Sep. 16, 1980

[54] POWER TRANSFER CIRCUIT

[75] Inventor: Jean Chabrol, Asnieres, France

[73] Assignee: Regie Nationale des Usines Renault, Boulogne-Billancourt, France

[21] Appl. No.: 950,024

[22] Filed: Oct. 10, 1978

[30] Foreign Application Priority Data

Oct. 19, 1977 [FR] France .................................. 77 31461

[51] Int. Cl.$^2$ ............................................. H04B 5/02
[52] U.S. Cl. ............................ 340/870.07; 340/207 R; 336/123; 370/37
[58] Field of Search ............... 339/5 R, 6 R, 7 R, 8 R; 336/123; 340/207 R, 183, 186, 200, 189 M; 343/225

[56] References Cited

U.S. PATENT DOCUMENTS

| | | | |
|---|---|---|---|
| 3,535,618 | 10/1970 | Perrins | 336/123 X |
| 3,594,587 | 7/1971 | Martens | 307/149 |
| 3,621,443 | 11/1971 | Sewell | 339/8 R |
| 3,713,124 | 1/1973 | Durland et al. | 340/207 R X |
| 3,771,830 | 11/1973 | Hartley et al. | 339/5 R X |
| 3,824,857 | 7/1974 | Smith | 340/207 R X |
| 4,011,551 | 3/1977 | Adler | 340/207 R X |

FOREIGN PATENT DOCUMENTS 235429  8/1964  Fed. Rep. of Germany .......... 336/123

*Primary Examiner*—L. T. Hix
*Assistant Examiner*—James L. Dwyer
*Attorney, Agent, or Firm*—Owen, Wickersham & Erickson

[57] ABSTRACT

In a robot, the transmission of electrical power and signals is effected without contact at a joint position, either by using a magnetic coupling provided by means of a transformer formed by windings housed in ferrite cores, or by capacitive coupling obtained by means of two capacitors formed by annular surfaces facing each other, the two cores or the two plates being at a predetermined spacing so that one part of the robot is able to turn by more than 360° around an axis relative to another part without any limit on rotation.

4 Claims, 5 Drawing Figures

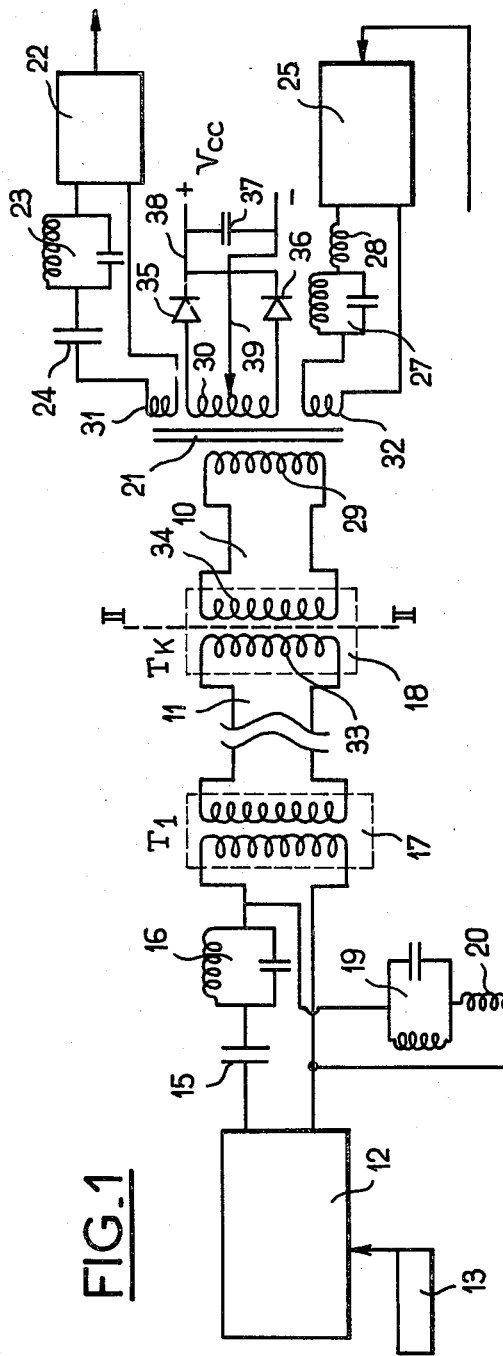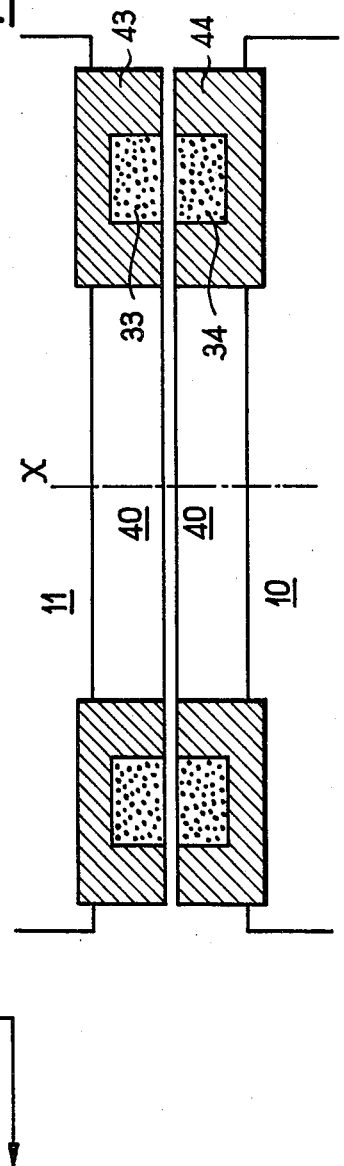

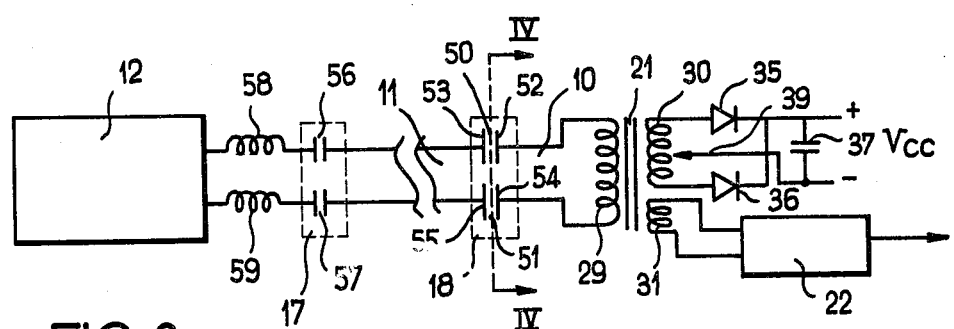
FIG_3
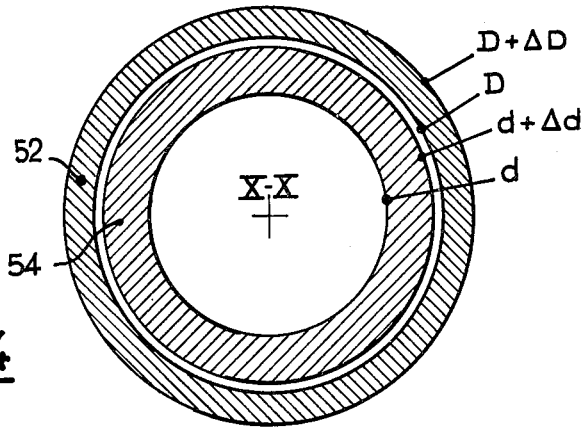
FIG_4
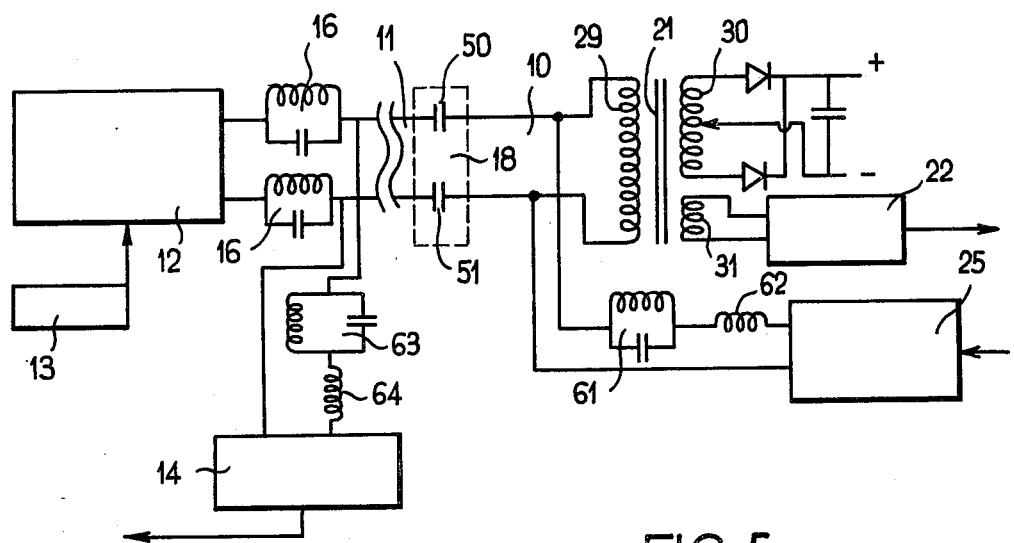
FIG_5

POWER TRANSFER CIRCUIT

This invention relates to a circuit allowing the transfer of electrical power and signals along the members of a robot as far as its ends, without contact at the level of certain of its joints.

In a manipulator robot, the axis which carries the end gripping tool comprises one or several actuators (hand or claw which is closed on a command which either comes from a computer or is locally developed), from which arises the necessity for having at one's disposal a source of power of the order of some hundreds of watts in the form of a d.c. voltage. Now, a robot "arm" includes several connection joints between different axes and some of them are joints where the angle of rotation between the two axes is made to exceed 360°, this being for reasons of convenience of movement and rapidity of execution.

Consequently the inlet cables for electrical power at the end of the arm must have great flexibility and must be provided with sufficient "slack" at the level of each joint. Even so, with such precautions, an accident is not precluded, especially during learning manoeuvres.

This is why it is of interest to have at one's disposal, on the final axis of the robot, and also on the previous axes, if necessary, electrical power available in direct form and carried by a means other than cables at the joint positions.

Certain telemetering data issued by the end tool must also be capable of being transmitted through the joints to the computer which controls the general functioning of the machine.

It is therefore advantageous if the circuit for transmission of power also carries remote control instructions from the computer to the end of the robot's arm and also telemetering data issued by the end tool of the robot and intended for the computer.

A circuit according to the present invention which allows the transmission of electrical power the whole length of a robot as far as its free end, comprises a generator of power at a predetermined frequency for supplying at the level of the end axis electrical power in d.c. form, the circuit comprising means allowing the electrical power to pass, without contact, at least one of the joints of the robot so that its actuator is able to effect rotations of more than 360° while remaining supplied with electrical power.

Advantageously, the passing means has an annular structure at the level of the rotary joints of the robot.

In a first preferred embodiment of the invention, the passing means is formed, at each rotary joint position, by a transformer, each of the windings of which is housed in a ferrite core, the two ferrite cores being capable of turning relative to each other about a common axis in parallel planes at a predetermined spacing from each other.

According to a second preferred embodiment of the invention, the passing means is formed, at each rotary joint position, by an assembly of two annular capacitors each comprising two surfaces facing each other and at a predetermined spacing from each other in the air as dielectric.

In another preferred embodiment, the circuit for transmission of electrical power which is suitable for a robot of the type including a computer which controls the general functioning of the machine, is able to carry remote control instructions from the computer to the end of the actuator of the robot, due to the addition of a remote control transmitter, modulation of the frequency of the power generator at one end of the robot, and the addition, at the opposite end provided with the actuator, of a supplementary secondary winding on the transformer supplying electrical power in direct form, to which winding is connected a frequency modulation receiver.

In the preceding circuit there is preferably connected to the end of the robot provided with the actuator, a telemetering transmitter to transmit at a frequency F, greater than the transmission frequency of the power generator, whilst at the opposite end of the circuit for transmission of electrical power, in parallel with the power generator, there is connected a telemetering receiver tuned to the frequency F.

Other characteristics will be evident from the description which follows and which is given only by way of example. To this end, reference will be made to the attached drawings, in which:

FIG. 1 represents a first embodiment of a circuit according to the present invention, for transmitting electrical power to a robot, FIG. 2 is a detailed cross-section taken along a line II—II in FIG. 1 corresponding to a joint of the robot, FIG. 3 represents a second embodiment of a circuit according to the present invention for transmission of electrical power to the robot, FIG. 4 is a detailed cross-section taken along a line IV—IV of FIG. 3 corresponding to a joint of the robot, FIG. 5 shows a second embodiment of a circuit according to the present invention in its more complete version, which allows the simultaneous transmission of power, of remote control instructions and of telemetering signals.

The same references designate the same elements in the different figures.

Referring to FIG. 1, a circuit for transmission of electrical power for an end actuator 10 of a robot comprises a power generator 12 for transmitting an alternating current at the frequency f. This alternating wave can be modulated at a deviation $\Delta f$ by a remote control signal generator 13. At the end of the circuit opposite to that containing the power generator 12 is a transformer 21 allowing the matching of the circuit to its load. This transformer 21 is disposed on the actuator 10 of the robot. The d.c. voltage $V_{cc}$, necessary for supplying the load, is obtained by rectification of the supply from the terminals of a central secondary winding 30 of the transformer 21. This supply is rectified by means of power diodes 35 and 36 and the direct voltage $V_{cc}$ is available at the terminals of a capacitor 37 connected between a line 38, interconnecting the cathodes of the diodes 35 and 36, and a centre tap 39. The transformer 21 comprises, in addition, two other secondary windings 31 and 32. To the secondary winding 31 is connected a remote control receiver 22, via a series circuit comprising a capacitor 24 and a parallel resonant L.C. circuit 23. To the secondary winding 32 is connected a telemetering transmitter 25 transmitting on a frequency F, greater than the transmission frequency f of the power generator 12. This telemetering transmitter 25 is connected to the secondary winding 32 via a series circuit comprising a resonant L.C. circuit 27 and an inductor 28. Due to the miniaturisation of electronic circuits which has now been achieved, it will be realised that the assembly of electronic circuits connected to the three secondary windings 30, 31, 32 represents very little in volume and weight compared with the volume and weight of the actuator, and can consequently be easily accommodated.

At least one joint 17 and/or 18 of the robot is by-passed, thanks to a transformer as represented in FIG. 2. Each joint transformer 17 and 18 is formed of two windings 33 and 34, each housed in a ferrite core 43 and 44, of which a view in section in a plane containing the axis X—X of rotation of the joint is represented in FIG. 2. Each of the assemblies 43, 33 and 44, 34, that is to say the ferrite core plus winding, is integral around the axis X—X common to the two parts 10 and 11 of the robot forming the joint. Coupling between the two windings 33 and 34 is ensured by the air clearance between the two ferrites 43 and 44. As the reluctance met by the lines of force of the magnetic field in the air gap is lower than that due to the central metal core 40, this coupling is efficient and the performance of such a transformer is acceptable, taking into account the order of magnitude of the power to be transmitted. This performance is, furthermore, to some extent not very sensitive to accidental variations in the air gap.

The power generator 12 is connected to the primary of the joint transformer 17 via a series circuit comprising a capacitor 15 and a parallel resonant L.C. circuit 16. In parallel on the primary winding of the joint transformer 17 there is also connected a telemetering receiver 14, functioning at the frequency F, via a series circuit comprising an inductance 20 and a parallel resonant L.C. circuit 19. This telemetering receiver 14 works in liaison with the transmitter 25.

This circuit allows the transmission to the end actuator of remote control instructions from the transmitter 13 to the receiver 22, the frequency of the power generator 12 being modulated by the remote control signal. It further allows the simultaneous transmission of power and remote control instructions and of telemetering signals in the opposite direction from the transmitter 25 to the receiver 14.

The filtering components act as follows. The circuit 15, 16 or in addition 23, 24 has, theoretically, an infinite impedance for the frequency F signals and a zero impedance for the frequency f signals. The assembly 19, 20 or in addition 27, 28 has, theoretically, an infinite impedance for the frequency f signals and a zero impedance for the frequency F signals. It has already been specified that the frequency F is greater than the frequency f.

The secondary winding 30 of the transformer 21 which is loaded by the rectifier circuit does not constitute a load for the telemetering transmitter 25, in as much as the rectified direct voltage $V_{cc}$ is in a range greater than the outlet voltage from the telemetering transmitter 25 multiplied by the ratio of the number of turns of the secondary windings 30 and 32, because in these conditions the diodes 35 and 36 do not conduct. All the power at the frequency F is therefore transmitted to the telemetering receiver 14. To take a specific example, the joint 18 may be that joint which connects the wrist 11 of a robot to its gripping instrument 10, and the joint 17 may be that joint which connects the wrist to the fore-arm of the robot.

FIGS. 3 and 4 illustrate a second embodiment of the invention according to which the transformers $T_1 \ldots T_K$ of FIGS. 1 and 2, which allow the by-passing of joints 17, 18 without contact, are replaced by capacitors 50 and 51 for the joint 18, and 56 and 57 for the joint 17. FIG. 4 illustrates the coaxial position of the plates 52 and 54 of the capacitors 50 and 51 of the joint 18 which are integral with the part 10 of the robot supporting the gripping instrument. Opposite the plates 52 and 54 of the capacitors 50 and 51 are two other plates 53 and 55, separated from the first by a distance e, the air in the space being the dielectric. The capacitors 50 and 51 are selected so as to be of equal value. In the same way, the bypassing at the position of the joint 17 is made via two capacitors 56 and 57, the plates of which are annular surfaces facing each other. These surfaces are integral at the joint position with each of the robot's parts, for example the wrist and the fore-arm, which provide the joint 17 between them. The power generator 12 is connected to the capacitors 56 and 57 via two equal value inductors 58 and 59 with the object of creating series resonances intended to cancel the reactive impedances of the capacitors 50 and 56 in series.

The circuit in FIG. 3 allows the transmission of remote control instructions to the actuator by connecting a frequency modulation receiver 22 to a special winding 31 of the transformer 21 as previously described in connection with FIG. 1.

This circuit, in its most complete version, which is represented in FIG. 5, also allows the transmission of telemetering, due to a telemetering transmitter 25 transmitting at a frequency F far greater than the frequency f of transmission of the power generator 12, while to the opposite end of the power transmission circuit, in parallel with the power generator 12, is connected a telemetering receiver 14 tuned to the frequency F. As regards the filtering components necessary, their function is as follows. The resonant L.C. circuit 16 has, theoretically, an infinite impedance for the frequency F signals and, combined with the capacitor 50 or 51, a zero impedance for the frequency f signals. The resonant L.C. circuit connected to the inductor 62 or, in addition, the resonant L.C. circuit 63 connected to the inductor 64 theoretically has an infinite impedance for the frequency f signals and zero impedance for the frequency F signals. The primary 29 of the transformer 21 constitutes a very large impedance for the frequency F signals.

To avoid radiation of the f and F frequency signals, screening is provided at each joint position. A calculation based on the equality of the areas of the capacitors 50 and 51, for which the following values are assumed for the diameters of circles delimiting the plates of the annular capacitors according to the representation in FIG. 4:

d = 170 mm.;   $d + \Delta d$ = 111.25 mm.
D = 216.25 mm.;   $D + \Delta D$ = 280 mm.

allows it to be established that, with an air gap of one millimeter, the value of each capacitor is of the order of one hundred picofarads and for a frequency f = 40 kHz, the required value of inductors deduced therefrom is: L/k = 100 m Henry for k successive joints.

The capacitor can be formed by printed circuit techniques, that is to say each plate, such as 52 or 54 in FIGS. 3 and 4, is formed by an annulus of very thin copper disposed on an appropriate substrate.

I claim:

1. A control circuit for a manipulator robot of the type having a power source and a device which controls the functioning of the robot, said robot having a plurality of connection joints between the power source and a free end having an end axis and an actuator, said control circuit transmitting electrical power along the members of the robot to carry remote control instructions from the control device to the free end of the robot, said robot comprising:

generator means for generating alternating-current electrical power at a predetermined frequency, a power-transmission circuit for conducting said power from said generator means to said actuator, said circuit including rotary means connecting successive portions of said circuit without continuous contact, and, at least at one of the robot's joints, enabling rotation of one member of the robot and of said transmission circuit with respect to another member of the robot, each said rotary means comprising a first transformer with its primary and secondary windings each housed in a separate ferrite core, the cores being rotatable relative to each other in parallel planes around a common axis, and control transmitting means to carry remote control instructions comprising a remote control transmitter which modulates the frequency of the power generated by the power generator at one end of the robot, at the opposite end of the robot, a second, end transformer supplying electrical power to said free end and having a primary winding, a main secondary winding across which is a rectifier across which is placed the load of the actuator and a supplementary secondary winding, a frequency modulation receiver connected to said supplementary secondary winding, a telemetering transmitter connected to the free end of the robot provided with the actuator for transmitting along said power-transmission circuit at a frequency F greater than a transmission frequency f of the power generator, and a telemetering receiver tuned to the frequency F connected at the opposite end of the power-transmission circuit said telemetering receiver being connected to said power-transmission circuit F in parallel with said generator means and via a filter L-C circuit which conducts at frequency F at an impedance approaching zero and presents to frequency f an impedance approaching infinity, said power generator being connected to said power transmission circuit via a filter L-C circuit which conducts the frequency f at an impedance approaching zero and presents to the frequency F an impedance approaching infinity.

2. A control circuit for a manipulator robot of the type having a power source and a device which controls the functioning of the robot, said robot having a plurality of connection joints between the power source and a free end having an actuator, said control circuit transmitting electrical power along the members of the robot to carry remote control instructions from the control device to the free end of the robot, said robot comprising:

generator means for generating alternating-current electrical power at a predetermined frequency, a power-transmission circuit for conducting said power from said generator means to said actuator and having rotary means for enabling the electrical power to pass across at least one of the robot's joints without continuous contact, and thereby for enabling rotation at the joints, a telemetering transmitter at the free end of the robot provided with the actuator and connected to said power-transmission circuit, for transmitting along said power-transmission circuit at a frequency F greater than a transmission frequency f of the power generator, and a telemetering receiver tuned to the frequency F connected to the opposite end of the power-transmission circuit, said telemetering receiver being connected to said power-transmission circuit F in parallel with said generator means and via a filter L-C circuit which conducts at frequency F at an impedance approaching zero and presents to frequency f an impedance approaching infinity, said power generator being connected to said power transmission circuit via a filter L-C circuit which conducts the frequency f at an impedance approaching zero and presents to the frequency F or impedance approaching infinity.

3. The control circuit of claim 2 having means to carry remote control instructions, comprising:

a remote control transmitter which modulates the frequency of the power generated by the power generator, and an end transformer at the opposite end of the robot supplying electrical power to said free end and having a primary winding, a main secondary winding across which is a rectifier across which is placed a main load of the actuator, and a supplementary secondary winding, and a frequency modulation receiver connected to said supplementary secondary winding.

4. A control circuit for a manipulator robot of the type having a power source and a device which controls the functioning of the robot, said robot having a plurality of connection joints between the power source and a free end having an end axis and an actuator, said control circuit transmitting electrical power along the members of the robot to carry remote control instructions from the control device to the free end of the robot, said robot comprising:

generator means for generating alternating-current electrical power at a predetermined frequency, a power-transmission circuit for conducting said power from said generator to said actuator, said circuit including rotary means connecting successive portions of said circuit without continuous contact, at least at one of the robot's joints, enabling rotation of one member of the robot and of said transmission circuit with respect to another member of the robot, each said rotary means comprising a pair of concentric annular coupling condensers, having their plates in two parallel planes that are rotatable around a common axis, and control transmission means to carry remote control instructions comprising a remote control transmitter which modulates the frequency of the power generated by the power generator at one end of the robot, at the opposite end of the robot, an end transformer supplying electrical power to said free end and having a primary winding, a main secondary winding across which is a rectifier across which is placed the load, the actuator, and a supplementary secondary winding, a frequency modulation receiver connected to said supplementary secondary winding, a telemetering transmitter connected to the free end of the robot provided with the actuator for transmitting along said power-transmission circuit at a frequency F greater than a transmission frequency f of the power generator; and a telemetering receiver tuned to the frequency F connected at the opposite end of the power-transmission circuit, said telemetering receiver being connected to said power-transmission circuit F in parallel with said generator means and via a filter L-C circuit which conducts at frequency F at an impedance approaching zero and presents to frequency f an impedance approaching infinity, said power generator being connected to said power transmission circuit via a filter L-C circuit which conducts the frequency f at an impedance approaching zero and presents to the frequency F an impedance approaching infinity.

* * * * *